(12) United States Patent
Fukuo

(10) Patent No.: US 7,765,642 B2
(45) Date of Patent: Aug. 3, 2010

(54) OPERATING MECHANISM OF MOVABLE MEMBER, AND AUTOMOBILE STORAGE APPARATUS

(75) Inventor: Michihiro Fukuo, Hachioji (JP)

(73) Assignee: NIFCO Inc., Yokohama-shi, Kanagawa-ken (JP)

( * ) Notice: Subject to any disclaimer, the term of this patent is extended or adjusted under 35 U.S.C. 154(b) by 417 days.

(21) Appl. No.: 11/433,674

(22) Filed: May 15, 2006

(65) Prior Publication Data
US 2006/0265864 A1 Nov. 30, 2006

Related U.S. Application Data

(63) Continuation-in-part of application No. 10/268,950, filed on Oct. 11, 2002, now Pat. No. 7,063,225.

(30) Foreign Application Priority Data
Oct. 29, 2001 (JP) ............................. 2001-330738
May 26, 2005 (JP) ............................. 2005-153616

(51) Int. Cl.
*G02C 5/22* (2006.01)
(52) U.S. Cl. .......................................... 16/228; 16/354
(58) Field of Classification Search .................. 16/78, 16/79, 77, 71, 277, 280, 291, 293, 354, 54, 16/50; 185/39; 220/264
See application file for complete search history.

(56) References Cited

U.S. PATENT DOCUMENTS 14,583 A * 4/1856 Barton ........................... 16/79
5,386,884 A * 2/1995 Chisholm ..................... 185/39
5,893,478 A * 4/1999 Maruoka ..................... 220/827
6,158,063 A * 12/2000 Tudor ............................. 4/500
6,189,181 B1 * 2/2001 Bissett ........................... 16/78
6,609,631 B2 * 8/2003 Asami ......................... 220/817
6,662,405 B2 * 12/2003 Vitry ............................ 16/355
7,044,529 B2 * 5/2006 Svenson et al. ............ 296/37.8
7,063,225 B2 * 6/2006 Fukuo ......................... 220/264

FOREIGN PATENT DOCUMENTS

| JP | H07-9916 A | 1/1995 |
|----|------------|--------|
| JP | 2590415 | 12/1998 |
| JP | 2003-129742 | 5/2003 |

* cited by examiner

*Primary Examiner*—Victor Batson
*Assistant Examiner*—Matthew Sullivan
(74) *Attorney, Agent, or Firm*—Manabu Kanesaka

(57) ABSTRACT

An operation mechanism attaches a movable member to a main body to be rotatable between a first position and a second position. The movable member is held in the first position by a locking device. The operation mechanism includes a base attached to the main body, a contact portion attached to the movable member, and a coil spring having one end fixed to the base, and the other end attached to the contact portion for urging the movable member in the first position toward the second position. A transfer track for the contact portion is formed at the base. By the transfer track, after the movable member in the first position is moved to a predetermined position by a force accumulated on the spring, when the movable member is pushed to the second position, the spring stores a force from the predetermined position to the second position.

12 Claims, 10 Drawing Sheets ical Publication No. 2003-129742 shows an
OPERATING MECHANISM OF MOVABLE MEMBER, AND AUTOMOBILE STORAGE APPARATUS

CROSS REFERENCE TO RELATED APPLICATION

This is a continuation in-part application of patent application Ser. No. 10/268,950 filed on Oct. 11, 2002, and issued on Jun. 20, 2006 as U.S. Pat. No. 7,063,225.

BACKGROUND OF THE INVENTION AND RELATED ART STATEMENT

The present invention relates to an operating mechanism with a movable member wherein the movable member is assembled with a main body to be rotatable between a first position and a second position, is maintained in the first position such that the first position is unlocked by locking means, and is forcibly rotated toward the second position due to unlocking of the locking means and an automobile storage apparatus having the operating mechanism.

Japanese Patent Publication No. 2003-129742 shows an opening and closing apparatus, wherein a first fixing gear portion engaging an arc-like gear portion provided in an arm portion of a door member is provided in a base member; and the door member is rotated along the track corresponding to the first fixing gear portion between the closed position where the opening of the base member is closed, and the opening position.

In the above-mentioned opening and closing apparatus, the door member in the closed position is forcibly rotated up to the open position by the function of a tension coil spring. However, the rotation of the door member increases by the operation of the weight of the door member as well, as the door member approaches the open position.

In the operating mechanism wherein the movable member is combined with the main body in order to forcibly rotate toward the second position from the first position by urging means, a main problem to be solved in the present invention is to effectively reduce the force of the rotation between a predetermined rotational position and the second position by a simple structure.

Further objects and advantages of the invention will be apparent from the following description of the invention.

SUMMARY OF INVENTION

In order to solve the above-mentioned problems, the present invention comprises the following (1)-(4) as an operating mechanism of a movable member.

(1) A movable member is assembled with a main body to be rotatable between a first position and a second position, is maintained in the first position and can be unlocked by locking means.

(2) A torsion coil spring whose one end is fixed to the side of the main body and whose other end is always pressed against a contact portion provided on the side of the movable member, is provided.

(3) A rotational urging force toward the second position is acted on the movable member in the first position by the spring.

(4) The transfer track of the contact portion is set in such a way that the contact portion is pressed by the other end of the spring in the direction of allowing the spring to store a force to the second position after the movable member is rotated to a predetermined position due to a rotational urging force by unlocking the locking means.

According to the structure, the movable member situated in the first position by the locking means can be forcibly rotated (rotated back) to the second position by the urging force of the spring due to unlocking. Also, the force of the rotation of the movable member is reduced during the period of reaching to the second position after the movable member is rotated to the predetermined position, since the contact portion presses the other end of the spring in the direction that the spring can store the force.

More specifically, according to the operating mechanism, the force of back traveling of the movable member can be effectively reduced by a simple structure at the end of the back traveling of the movable member.

Herewith, a high quality of the movement of the movable member can be provided, and an impact noise at the end of the back traveling can be prevented. Especially, when the movable member is operated in such a way as to face horizontally in the first position and face vertically in the second position, the own weight of the movable member affects in such a way as to increase the force of the back traveling of the movable member, as the movable member comes to the second position. However, according to the operating mechanism, this effect can be effectively stopped.

The operating mechanism includes a rolling member provided in the side of the main body and rotating and traveling along a guide face of a guiding member constituted in such a way that the guide face is arranged along an arc of an imaginary circle, and connecting an axis member shaft provided in the center of the rotation to the side of the movable member. Also, the other end of the torsion coil spring supports the rolling member in such a way that the circumferential face of the rolling member is always pressed against the guide face of the guiding member, and when the rolling member is situated at the beginning of the guide face of the guiding member, the axis member of the rolling member can be always pressed against the axis member as the contact portion in such a way as to allow the spring to store the urging force in the direction wherein the rolling member is traveling toward the final end of the guide face.

In such a case, the movable member can be rotated to the second position by a movement wherein the rotation and transfer are combined by the rolling member which is transferred toward the final end of the guide face while the rolling member is rotating by the urging force of the spring.

A through-bore which allows the axis member to penetrate is formed on the side of the main body. Also, the inner face of the through-bore which faces the guide face of the guiding member becomes a bearing face of the axis member curved in accordance with a curve of the guide face. Furthermore, a pitch between the bearing face and the guide face can be made roughly equal to the radius of the rolling member.

In such a case, the state wherein the circumferential face of the rolling member is pressed against the guide face by the urging force of the spring can be stably maintained. The operating mechanism can be provided with a damper apparatus which provides a brake on the rotation of the movable member by operating on the rolling member.

In such a case, certain brake can be always applied on the rotation of the movable member by the spring.

In the case that an automobile storage apparatus is constituted in such a way that the movable member of the operating mechanism is a lid member closing the opening of the storage member as the main body installed inside the vehicle interior of an automobile in the first position, the end of the back traveling of the lid member, i.e., at the final stage of opening, the force of the back traveling of the lid member can be effectively reduced by the simple structure. Herewith, the high quality of the movement of the lid member can be provided, and the impact noise at the end of the back traveling can be prevented.

According to the operating mechanism of the invention, the movable member can be assembled with the main body with a simple structure while reducing the force of the rotation by the urging force of urging means between the predetermined rotational-position and the second position.

DETAILED DESCRIPTION OF PREFERRED EMBODIMENTS

Hereinafter, preferred embodiments of the present invention will be explained with reference to FIGS. 1-10.

Figure 1:
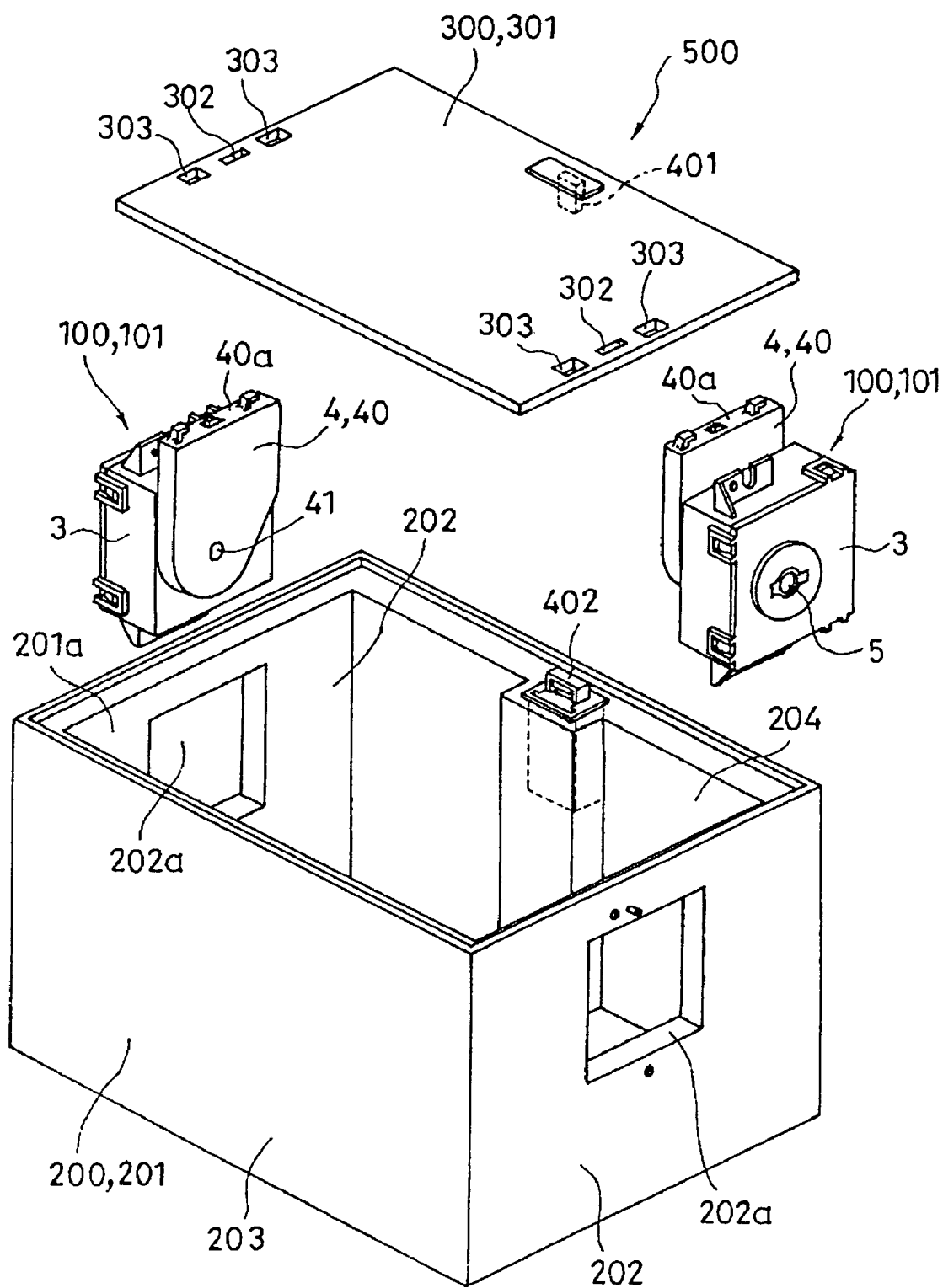
FIG. 1 is a separated perspective structural view showing an applied example of an operating mechanism 100 (supporting units 101)
Figure 2:
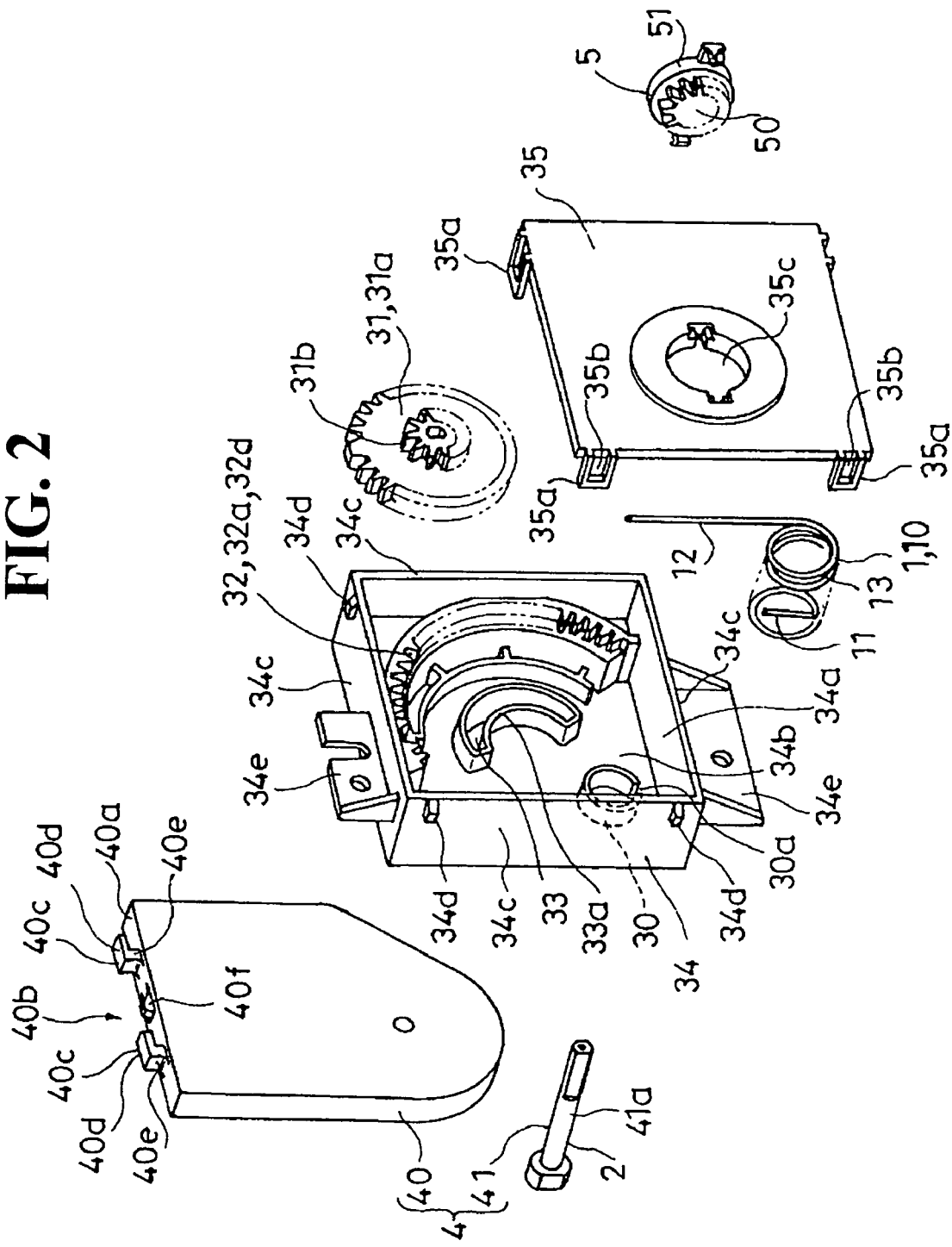
FIG. 2 is an exploded perspective structural view of the supporting units 101.
Figure 3:
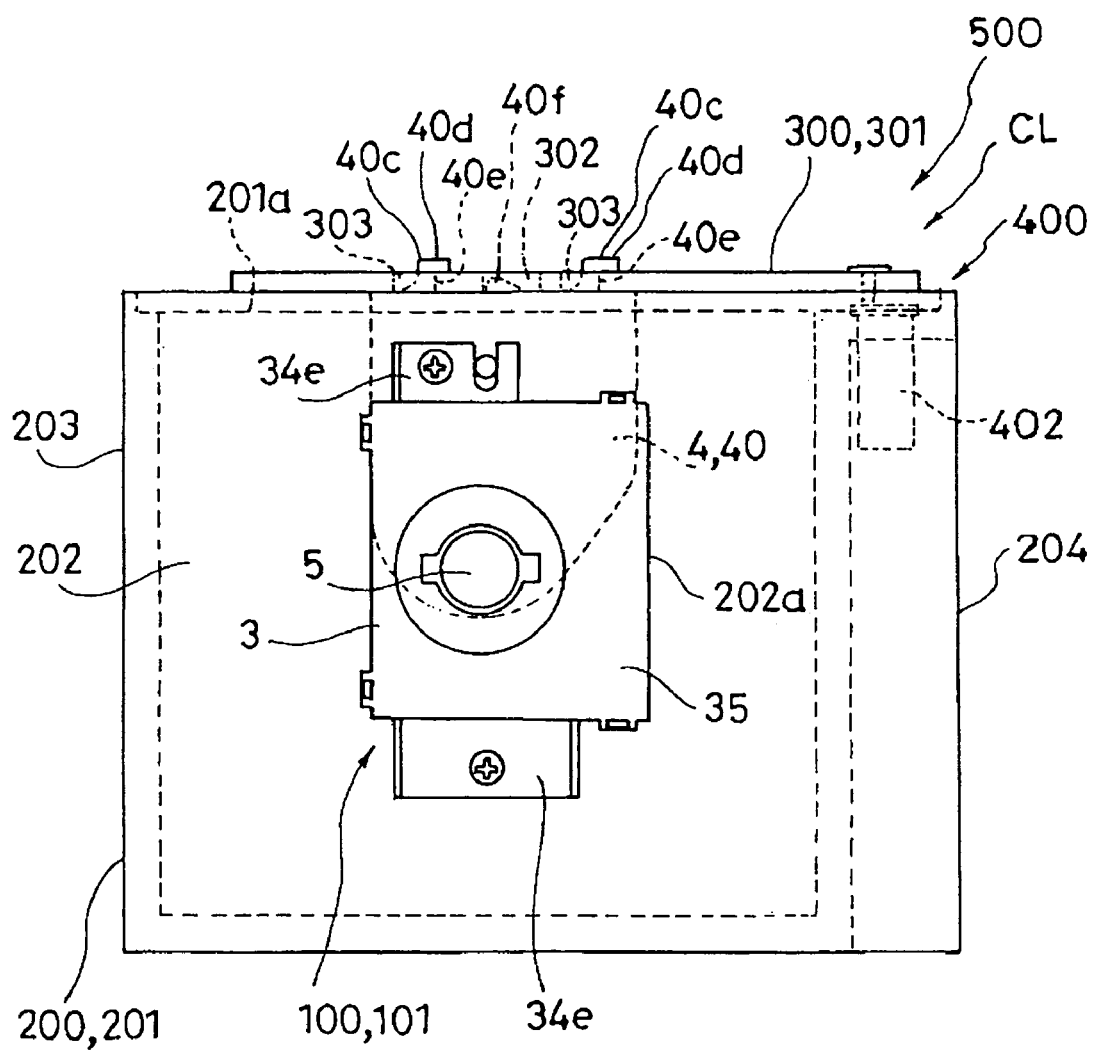
FIG. 3 is a side structural view wherein a movable member 300 is in a first position CL.
Figure 4:
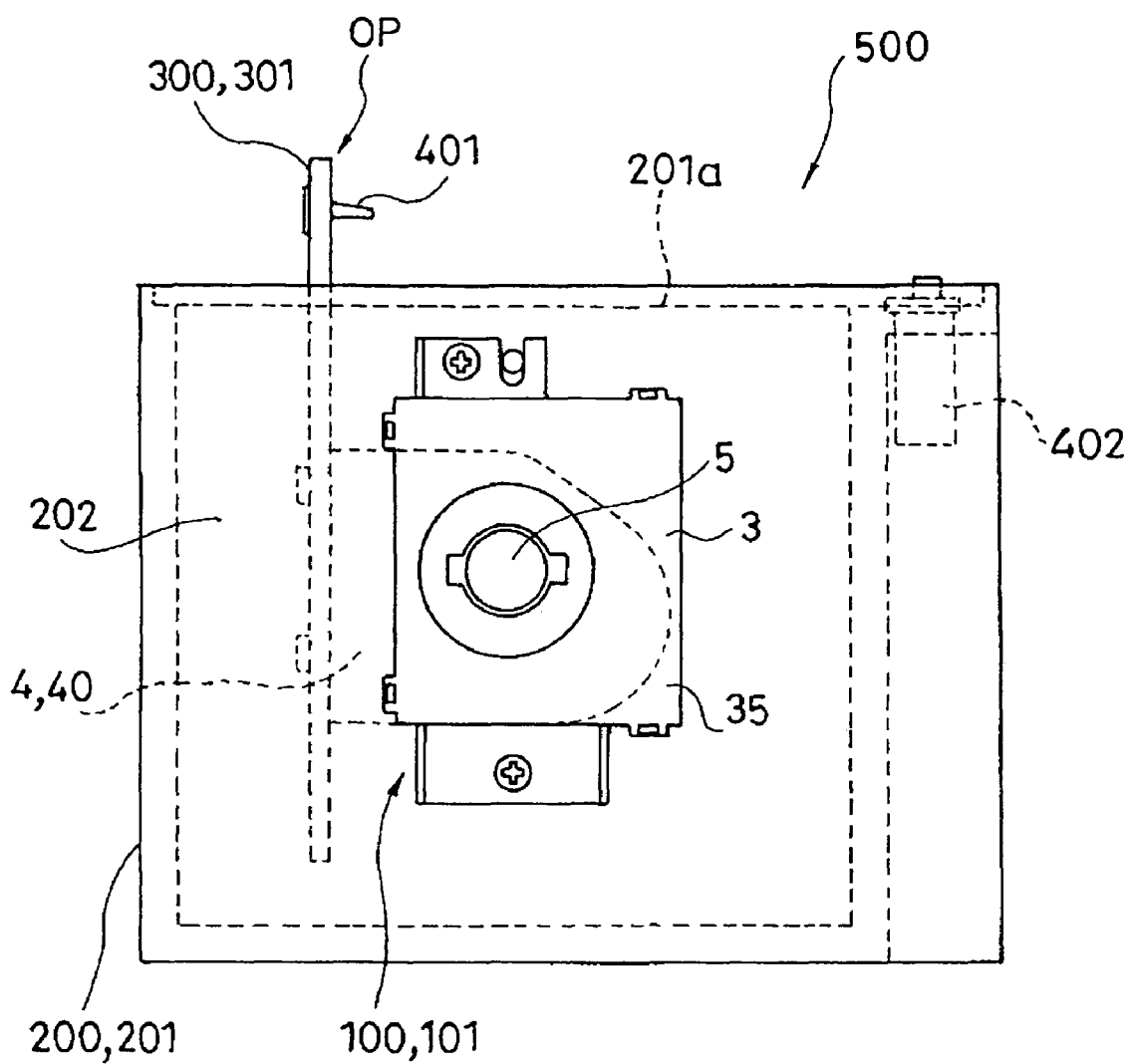
FIG. 4 is a side structural view wherein the movable member 300 is in a second position OP.

FIG. 1 shows an example wherein a lid member 301 is attached to a storage member 201 in order to be rotatable by supporting units 101 incorporating an operating mechanism 100, and wherein each element is separated. FIG. 2 shows one of the supporting units 101 in the state wherein each element constituting each supporting unit 101 is separated. FIG. 3 shows the lid member 301 (movable member 300) in the state of a first position CL, and FIG. 4 shows the lid member 301 in the state of a second position OP.

Figure 5:
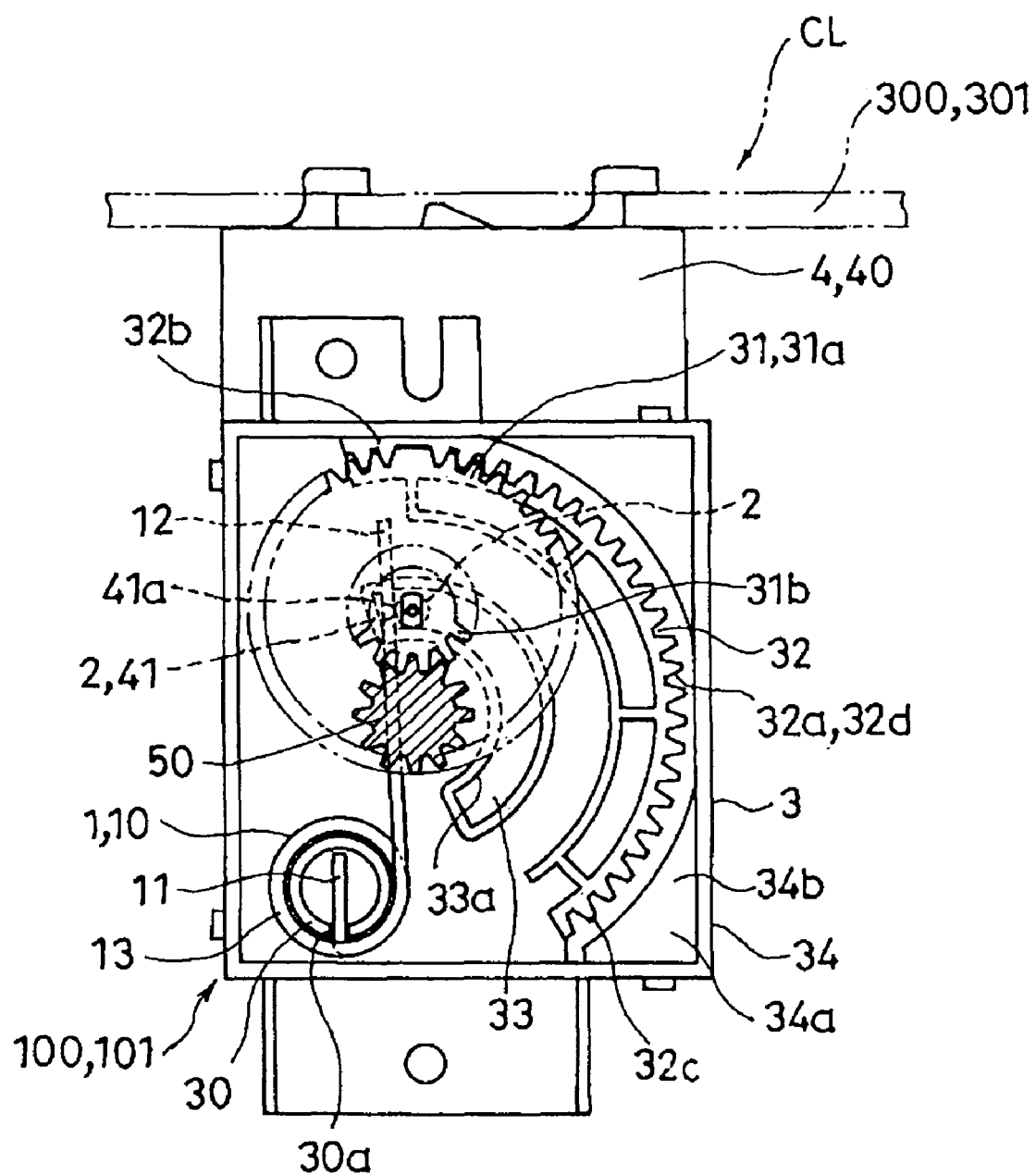
FIG. 5 is an internal structural view of the supporting units 101 (first position CL of the movable member 300)
Figure 6:
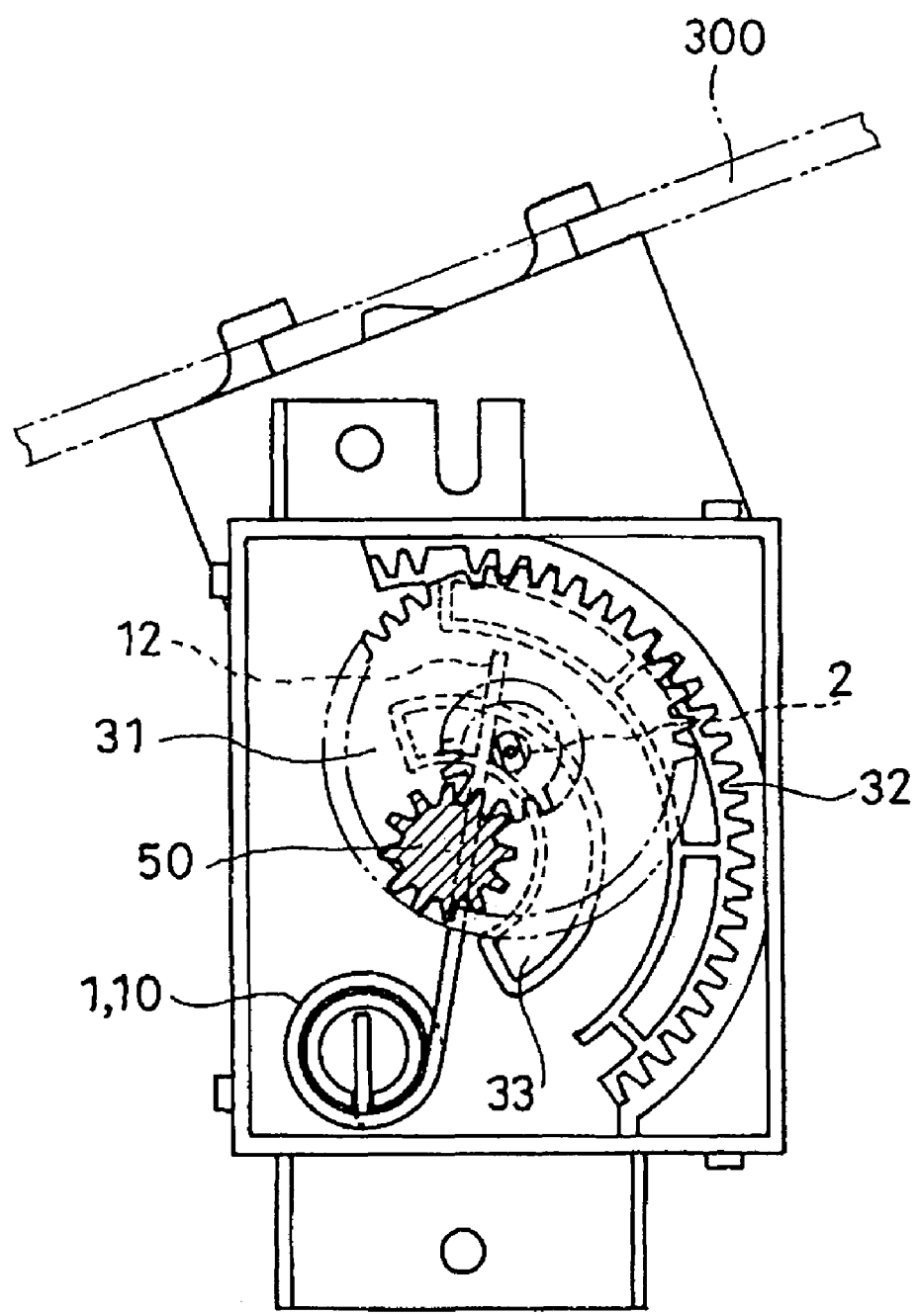
FIG. 6 is an internal structural view of the supporting units 101.
Figure 7:
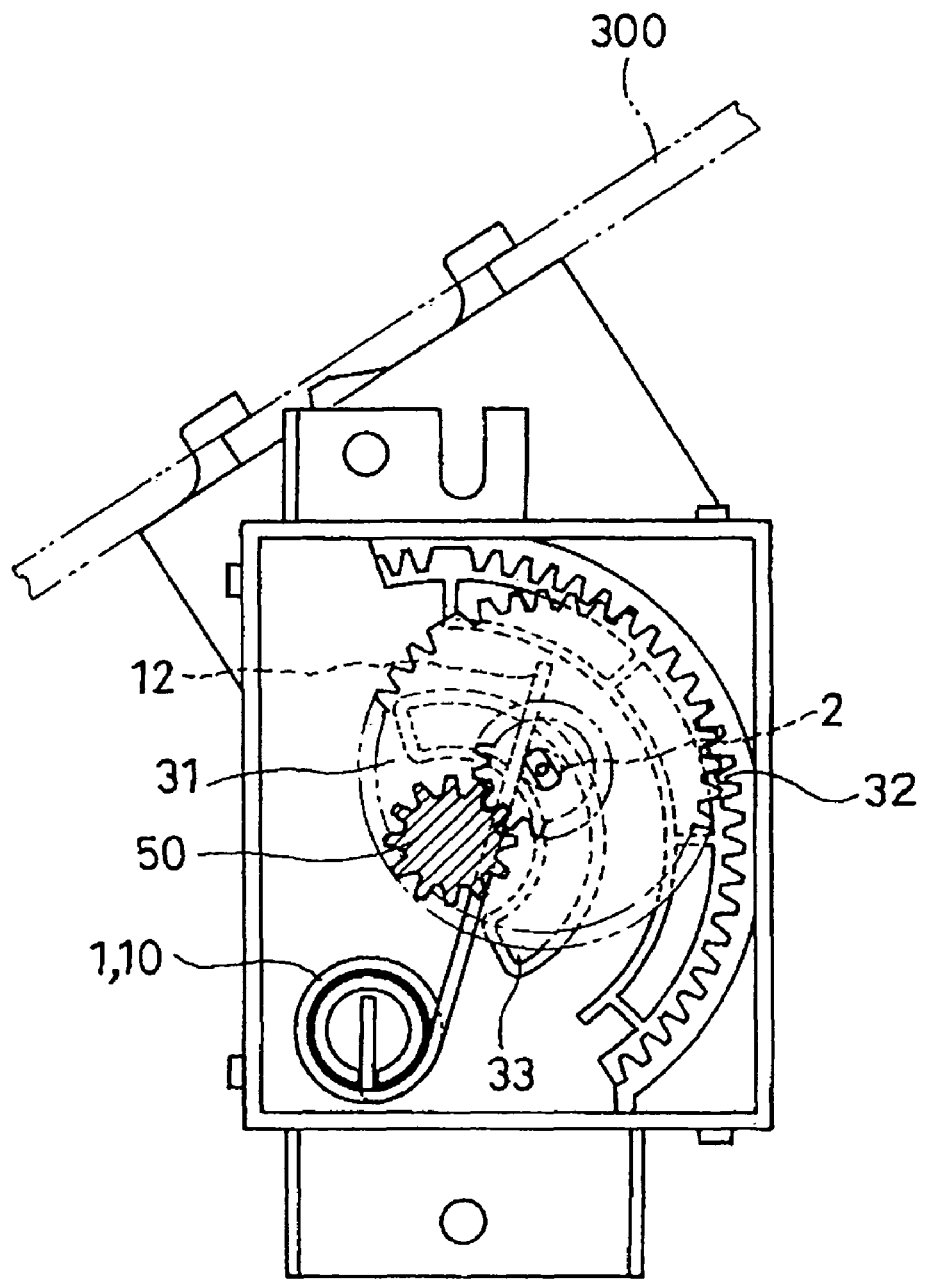
FIG. 7 is an internal structural view of the supporting units 101.
Figure 8:
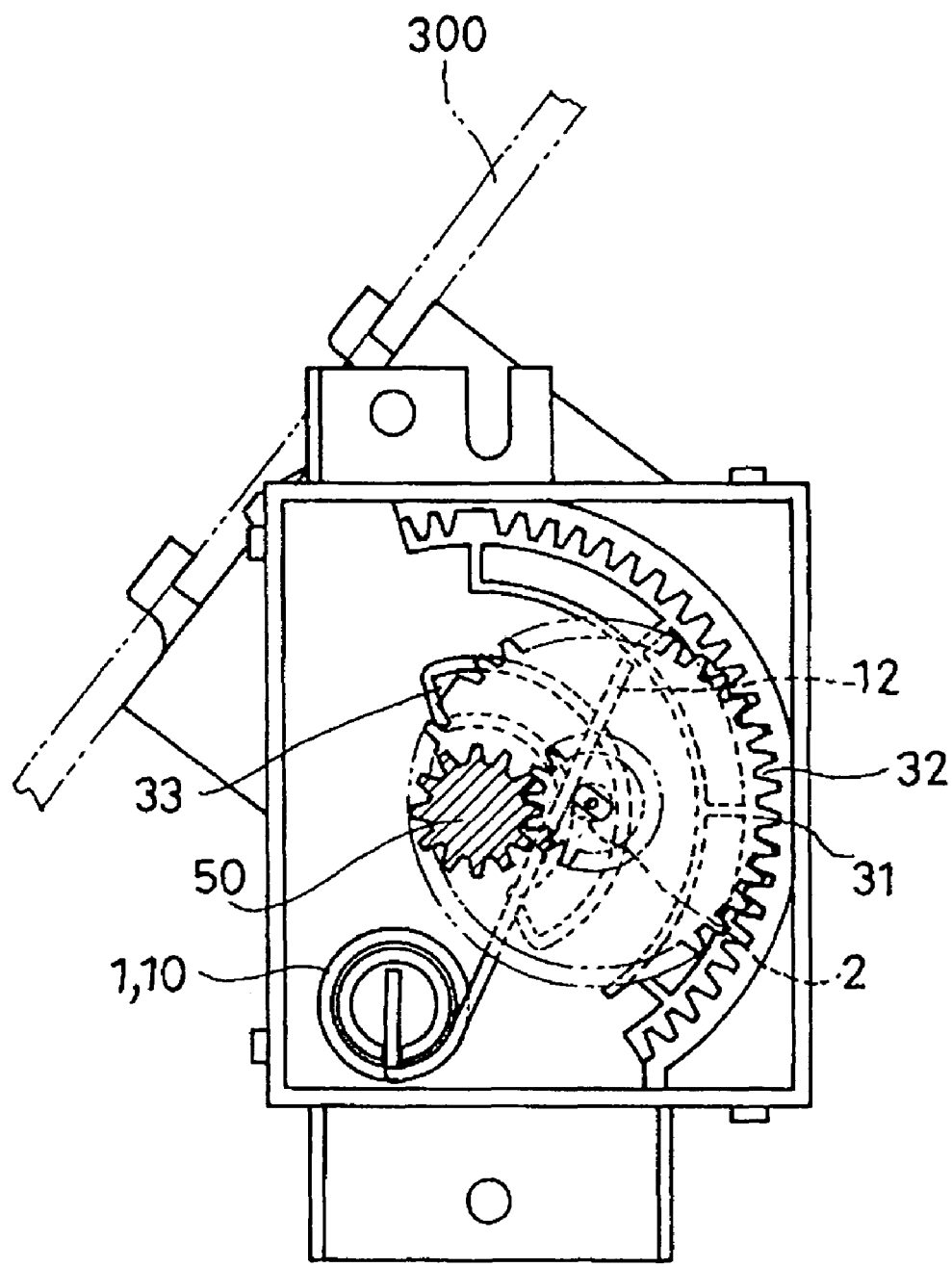
FIG. 8 is an internal structural view of the supporting units 101.
Figure 9:
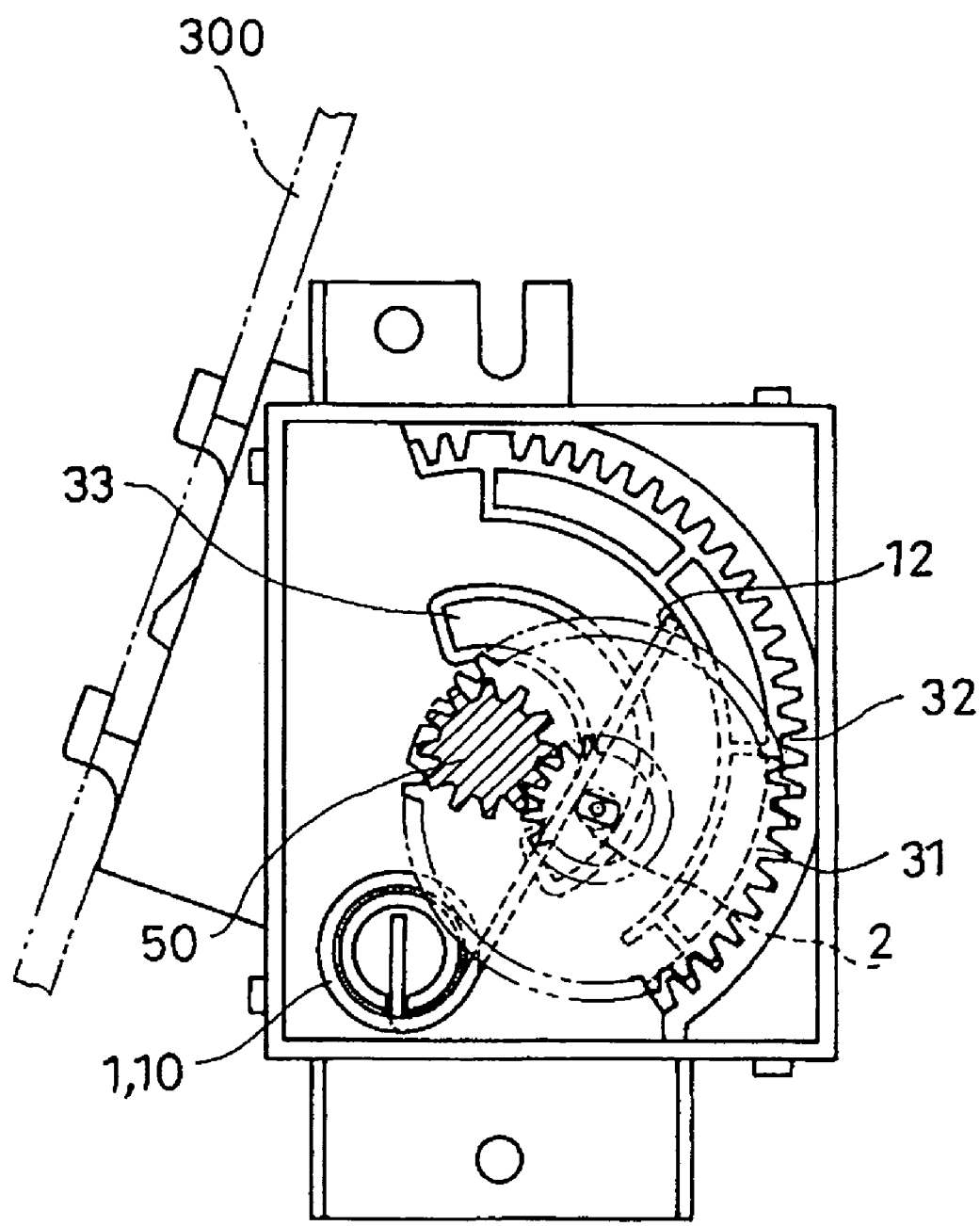
FIG. 9 is an internal structural view of the supporting units 101.
Figure 10:
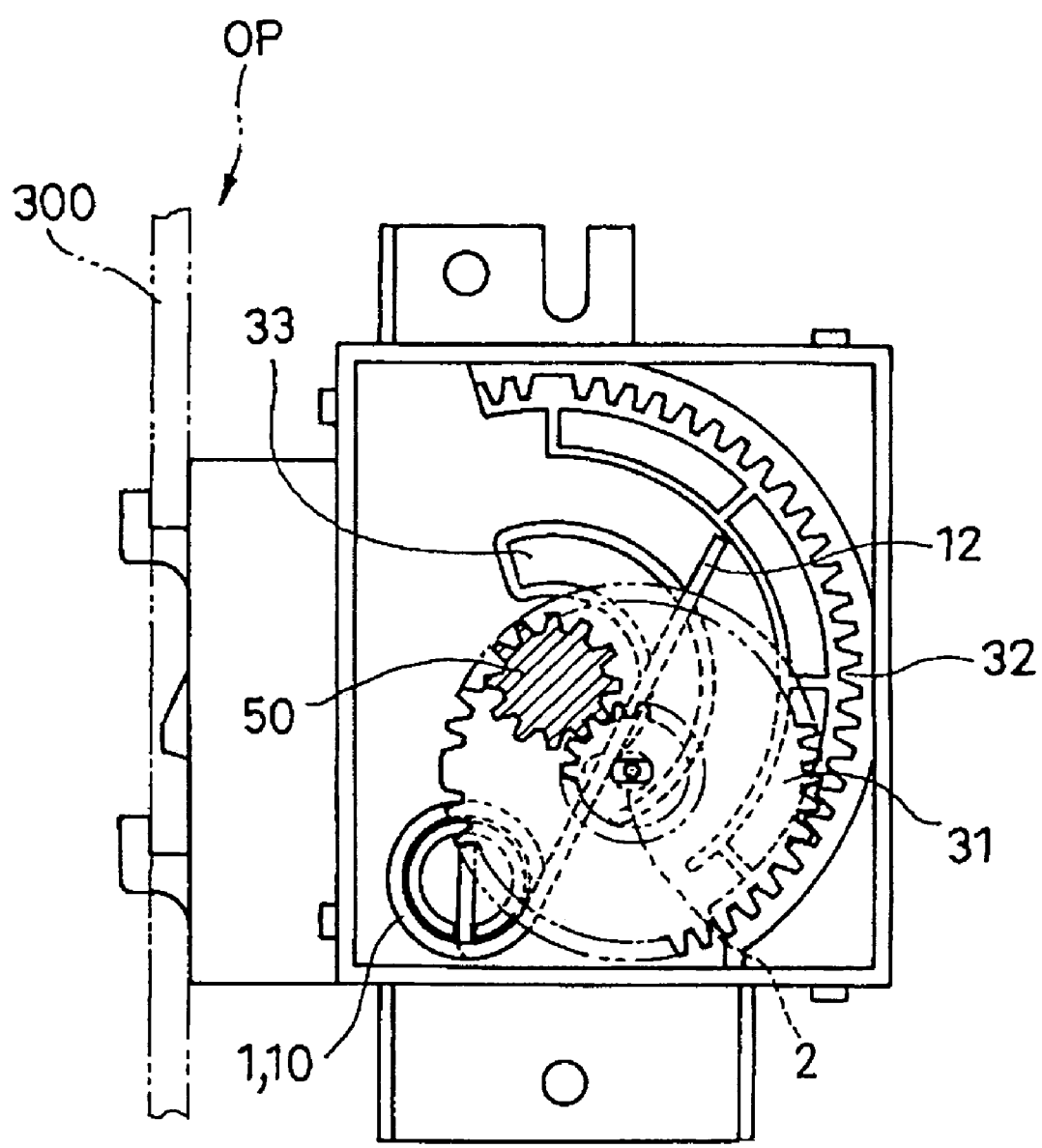
FIG. 10 is an internal structural view of the supporting units 101 (second position OP of the movable member 300).

FIGS. 5-10 show conditions of the operating mechanism 100 in an operating process of the movable member 300 wherein a cover 35 of a base 3 constituting supporting unit 101 is uncovered without a main body, respectively. Especially, FIG. 5 shows the condition wherein the movable member 300 is in the first position CL; and FIG. 10 shows the condition wherein the movable member 300 is the second position OP. The movable member 300 travels back and fourth in the order of FIGS. 5, 6, 7, 8, 9 and 10, and in the reverse order.

The operating mechanisms 100 (supporting units 101) in the embodiment are attached to a main body 200 to be rotatable in a range from the first position CL to the second position OP. Also, the movable member 300 maintained in the first position CL by the locking means 400 can be unlocked to be forcibly rotated toward the second position OP due to unlocking of the locking means 400. In addition, the movable members 100 and the main body 200 are assembled in such a way that the force of the rotation is allowed to be damped between a predetermined rotational position and the second position OP.

Also, a storage apparatus 500 of the embodiment is an automobile storage apparatus constituted with the operating mechanisms 100.

Each operating mechanism 100 includes urging means 1, which is arranged in such a way as to store the urging force in the direction of allowing the movable member 300 to rotate (travel back) toward the second position OP when the movable member 300 is in the first position CL. The urging means allows the movable member 300 to forcibly rotate (travel back) to the second position OP by releasing the stored urging force due to the unlocking. When the movable member 300 rotated to the second position OP is rotated (return to move) to the first position CL, the urging means 1 stores the urging force again.

In this embodiment, each urging means 1 is constituted by a torsion coil spring 10 whose one end 11 is fixed to the side of the main body 200 and whose other end 12 is always pressed against a contact portion 2 provided on the side of the movable member 300.

More specifically, in the example shown in the figures, a spring winding portion 13 is provided over a projecting portion 30 formed in the after-mentioned base 3 which is attached to the main body 200. Also, one end 11 which is folded back in to be located in the spring winding portion 13 is put into a fixing groove 30a of the projecting portion 30. As a result, one end 11 of the torsion coil spring 10 is fixed to the main body 200.

As mentioned above, the urging force to rotate toward the second position OP is acted on the movable member 300 which is in the first position CL by the spring 10.

In the example shown in the figures, the main body 200 is constituted as the storage member 201 which has a box-like shape and whose upper surface is an opening 201a. Also, the movable member 300 in the first position CL is located in a roughly horizontal position which closes the opening 201a of the main body 200 by the locking means 400. Also, the movable member 300 in the second position OP is located in a roughly vertical position, and constitutes the lid member 301 which is plate-like and opens the opening 201a.

More specifically, in the example shown it the figures, the movable member 300 has the length to fit between a pair of side plates 202 of the main body 200 and the width to close the opening 201a of the main body 200 in the first position CL. In the second position OP, the movable member 300 is stored in such a way that the upper end of the movable member 300 projects from the opening 201a of the main body 200 in a state of being roughly vertical to the inner surface of a back plate 203 of the main body 200.

In the example shown in the figures, free ends 40a of joint arms 40 of joints 4 which constitute the after-mentioned supporting units 101 are fixed to the movable member 300. Base ends of the joint arms 40 are fixed to axis members 41 connected to the rotational centers of rolling members 31 which are transferred above and below while rotating inside the bases 3.

Rotational axis lines of the rolling members 31 are placed in a direction perpendicular to the plate surfaces of the side plates 202 of the main body 200. In the example shown in the figures, the movable member 300 is attached to the main body 200 by the supporting units 101 mounted in the side plates 202 of the main body 200 to be able to have the above-mentioned operation.

In addition, in the example explained in the figures, the locking means 400 is located in the upper side of the upper end of a front plate 204 of the main body 200 in the first position CL of the movable member 300. Also, the locking means 400 is constituted by a striker 401 provided in the upper end projecting from the opening 201*a* of the main body 200 in the second position OP, and in such a way as to project downward from the undersurface of the movable member 300 in the first position CL; and a latching apparatus 402 formed in the upper end portion in a roughly middle position of the horizontal direction of the front plate 204 of the main body 200.

In the example shown in the figures, the latching apparatus 402 is so-called a push-push style latching apparatus. More specifically, in the example shown in the figure, when the movable member 300 in the second position OP is completely traveled back (first push), the striker 401 of the movable member 300 enters the latching apparatus 402 and is engaged with the latching apparatus 402 (locked state). Also, when the movable member 300 in the first position CL is pressed downward in such a way that the striker 401 is slightly entered into the further backward of the latching apparatus 402 (second push), the engagement between the striker 401 and the latching apparatus 402 is released (unlocked state).

In the operating mechanisms 100, after the movable member 300 is rotated up to the predetermined position by the rotating urging force due to the unlocking by the locking means 400, the transfer track of the contact portion 2 is set in such a way that the contact portion 2 presses the other end 12 of the spring 10 in the direction of allowing the spring 10 to store force up to the second position OP.

In the example shown in the figures, as described later, the axis members 41 connected to the rolling members 31 operate as contact portions 2.

Herewith, in the operating mechanisms 100 of the embodiment, the movable member 300 which is located in the first position CL by the locking means 400 can be forcibly rotated (rotate back) up to the second position OP by an urging force of the spring 10 due to the unlocking. Also, after the movable member 300 is rotated up to the predetermined position, the contact portion 2 presses the other end 12 of the spring 10 in the direction of allowing the spring 10 to store a force up to the second position OP.

Accordingly, the force of the rotation of the movable member 300 is reduced during this period. More specifically, according to the operating mechanisms 100, the force of back traveling of the movable member 300 can be effectively reduced by a simple structure at the end of the back traveling of the movable member 300.

Herewith, a high quality of the movement of the movable member 300 can be provided, and the impact noise at the end of the back traveling can be prevented. Especially, when the movable member 300 is operated in such a way as to face horizontally in the first position CL and face vertically in the second position OP, the own weight of the movable member 300 affects in such a way as to increase the force of the back traveling of the movable member 300, as the movable member 300 comes to the second position OP. However, according to the operating mechanisms 100, this effect can be effectively stopped.

Also, the operating mechanism 100 of the embodiment includes the rolling member 31 which rotates along a travel guide face 32*a* of guiding members 32 which is provided on the side of the main body 200 and is arranged along an arc of an imaginary circle. The rolling member 31 is connected to the axis member 41 on the side of the movable member 300. The other end 12 of the torsion coil spring 10 supports the rolling member 31 in such a way that the circumferential face of the rolling member 31 is always pressed against the guide face 32*a* of the guiding members 32. Also, the other end 12 is pressed to the axis member 41 of the rolling member 31 as the contact portion 2 such that when the rolling member 31 is situated at the beginning 32*b* of the guide face 32*a* of the guiding member 32, the spring 10 stores urging force in the direction of allowing the rolling member 31 to travel toward a final end 32*c* of the guide face 32*a*.

In the example shown in the figures, the guide face 32*a* extends above and below in such a way that the front plate 204 of the main body 200 formed inside the after-mentioned base 3 is the outside of the curve, and the guide face 32*a* faces backward. The rolling member 31 is provided in such a way as to contact the circumferential face with the guide face 32*a* inside the base 3. Also, the rolling member 31 includes the axis member 41 in the rotational center which enters into the side plate of the main body 200 through the after-mentioned groove-like through-bore 33 formed in the bases 3. In the example shown in the figures, the one end 11 of the spring is fixed to the projecting portions 30 provided at the back of the groove-like through-bores 33. Also, the other end 12 of the spring is always pressed against an intermediate part of the axis member 41, i.e., a place between a connecting end to the rolling member 31 in the axis member 41 and a connecting end to the after-mentioned each joint arm 40.

In the example shown in the figures, when the movable member 300 is situated in the first position CL, the upper end of the rolling member 31 is pressed against upper end (the beginning end 32*b*) of the guide face 32*a*. When the movable member 300 is situated in the second position OP, the front lower end of the rolling member 31 is pressed against the lower end (the final end 32*c*) of the guide face 32*a*.

Herewith, in the embodiment, when the rolling member 31 is situated at the beginning end 32*b* of the guide face 32*a*, the movable member 300 is set in the first position CL, so that the movable member 300 can be rotated to the second position OP by the movement combining the rotation and transfer of the rolling member 31 which is transferred toward the final end 32*c* of the guide face 32*a* while the rolling member 31 is rotating by the urging force of the spring 10.

In the example shown in the figures, the axis member 41 of the rolling member 31 has a concentric circle with an imaginary circle wherein each guide face 32*a* is arranged along the arc in the state of maintaining a distance for the radius of the rolling member 31 between the axis member 41 and the guide face 32*a*. However, the axis member 41 is transferred along the arc of the imaginary circle whose radius is smaller than that of the imaginary circle (the axis member 41, i.e., the transfer track of the contact portion 2).

Also, the other end 12 of each spring 10 is also transferred toward the final end 32*c* from the beginning end 32*b* of the guide face 32*a* with back traveling of the movable member 300. However, when the movable member 300 is situated between the predetermined position (generally the position in FIG. 8) and the second position OP (the position in FIG. 10), the axis member 41 is contacted with the other end 12 of the spring 10 in the position wherein the axis member 41 approaches the spring winding portion 13 closer than before (in the example shown in the figure, the position of approaching the spring winding portion 13 closer than before in the horizontal direction) (FIGS. 9, 10).

Herewith, in the example shown in the figures, after the predetermined position, the axis member 41 presses the other end 12 of the spring in a reverse direction for only the distance approaching the spring winding portion 13 while being pressed toward the final end 32c of the guide face 32a by an urging force of the other end 12 of the spring.

Also, in the embodiment, through-bore 33 which allows the axis member 41 to penetrate is formed on the side of the main body 200. Also, the inner face of the through-bore 33 which faces the guide face 32a of the guiding member 32 becomes bearing face 33a of the axis member 41 curved in accordance with curve of the guide face 32a. Furthermore, the pitch between the bearing face 33a and the guide face 32a is made roughly equal to radii of the rolling members 31.

More specifically, in the example shown in the figures, the groove-like through-bore 33 provided along the transfer track of the axis member 41 is formed in the after-mentioned base 3. In a groove wall face of the groove-like through-bore 33, the groove wall face facing the guide face 32a of the guiding member 32 operates as the bearing face 33a.

Herewith, in the embodiment, the state wherein the circumferential face of the rolling member 31 is pressed against the guide face 32a by the urging force of the spring can be stably maintained.

Also, in the embodiment, the guide face 32a of the guiding member 32 becomes a rack face 32d. Also, the rolling member 31 is constituted as the pinion member 31a engaging the rack face 32d.

Herewith, in the embodiment, the rolling member 31 can regularly rotate along the guide face 32a by the urging force of the spring 10, and the movable member 300 can travel back and forth regularly.

In addition, in the embodiment, the operating mechanism 100 includes a damper apparatus 5 which brakes the rotation of the movable member 300 by operating on the rolling member 31.

In the example shown in the figures, the damper apparatus 5 including a gear 50 and a case 51 housing a part of the gear 50 rotatably is attached to the cover 35 for closing an opening 34a of the case 34 of the after-mentioned base 3. Also, a gear portion 31b engaging the gear 50 of the damper apparatus 5 is formed in the center of the rotation of the end face of the rolling member 31 facing the cover 35. Viscose fluid such as silicone oil and so on is encapsulated inside the case 51 constituting the damper apparatus 5, and the rotation of the gear 50 is always braked by the viscose fluid.

Herewith, in the embodiment, the rotation of the movable member 300 by the spring is always constantly braked.

Also, in the embodiment, the operating mechanism 100 explained hereinbefore is unitized as the supporting unit 101 forming the base 3 and the joint 4. The base 3 of the supporting unit 101 is attached to the main body 200, and the joint 4 of the supporting unit 101 is attached to the movable member 300, so that the movable member 300 is assembled with the main body 200 in order to operate as mentioned above.

In the example shown in the figures, the base 3 is constituted by the case 34 and the cover 35. The case 34 includes roughly square-shaped bottom plate 34b, and side plates 34c made of resin in such a way as to surround the bottom plate 34b from all sides of the bottom plate 34b, and an opening 34a is situated at rising ends of the side plates 34c. The cover 35 is attached to the case 34 in such a way as to close the opening 34a of the case 34.

More specifically, the base 3 is constituted by attaching the cover 35 to the case 34 in such a way as to engage the engagement projections 34d formed on the outer surface of the side plate 34c of the case 34 with the engagement windows 35b of the elastic pieces 35a provided in side portions of the cover 35. Attachment bore 35c for the damper apparatus 5 is provided in the cover 35. The damper apparatus 5 is fitted into the attachment bore 35c in such a way as to arrange the side of the gear 50 inside the base 3. Also, in the example shown in the figures, the attachment pieces 34e which respectively project outward are formed in upper part and lower part of the case 34.

The base 3 is fixed to the side plate of the main body 200 with the attachment pieces 34e by screws in a state wherein the bottom plate 34b is put in a square-shaped bore 202a formed in the side plate 202 of the main body 200 up to the position such that the attachment pieces 34e are contacted with the outer surface of the side plate 202.

The base 3 includes the guiding member 32 which is constituted in such a way as to arrange the guide face 32a along the arc of the imaginary circle; the rolling member 31 rotating and traveling along the guide face 32a of the guiding member 32; and the urging means 1 which supports the rolling member 31 to be able for the circumferential face of the rolling member 31 to be always pressed against the guide face 32a of the guiding member 32, and at the same time, which stores the urging force in the direction of allowing the rolling member 31 to travel toward the final end 32c of the guide face 32a when the rolling member 31 is situated at the beginning end 32b of the guide face 32a of the guiding member 32.

In the example shown in the figures, the guide face 32a is constituted by an arc-like rib formed in the inner face of the bottom plate 34b of the case 34 of the base 3. The upper end of the above-mentioned rib is positioned in the middle of the upper side of the bottom plate 34b, and the lower end of the rib is positioned in the middle of the lower side of the bottom plate 34b. Also, the rib is formed in such a way that the outside of the curve of the middle portion of the rib is positioned in the middle of the front side (the side in the longitudinal direction of the bottom plate 34b directed to the front plate 204 of the main body 200) of the bottom plate 34b. The face directed to the back side (the side in the longitudinal direction of the bottom plate 34b directed to the back plate 203 of the main body 200) of the bottom plate 34b in the rib functions as the guide face 32a.

The groove-like through-bore 33 extending above and below with a curve following the curve of the guide face 32a is formed in the inner side of the curve of the guide face 32a in the bottom plate 34b of the case 34. The rolling member 31 is situated inside the case 34, and the circumferential face of the rolling member 31 is contacted with the guide face 32a in a state wherein the axis member 41 passes through the groove-like through-bore 33.

The torsion coil spring 10 which becomes the urging means 1 is fixed to the case 34 by the projecting portion 30 formed at corner between the lower side and back side of the bottom plate 34b of the case 34.

On the other hand, in the example shown in the figures, the joint 4 is constituted by the axis member 41 connected to the rolling member 31 of the base 3, and the joint arm 40.

The joint arm 40 is provided with fastening portions 40b to the movable member 300 in the arm free end 40a, and constituted as a plate-like member wherein the axis member 41 is fixed to the arm base end. The joint arm 40 is arranged in such a way that one surface of the joint arm 40 is located adjacent to the outer surface of the bottom plate 34b of the case 34 in the base 3.

In the example shown in the figures, the fastening portion 40b of the joint arm 40 is constituted by a pair of L-shaped pieces 40c including head portions 40d which can be respectively entered into a pair of long bores 303 formed in the movable member 300, and neck portions 40e; and engagement projecting portions 40f provided between the pair of L-shaped pieces 40c, and engaged with engagement bores 302 formed in between the pair of long bores 303 of the movable member 300, by transferring or comparatively transferring the joint arm 40 in an extending direction of the long bores 303 from the state wherein the L-shaped pieces 40c corresponding to the pair of long bores 303, 303 are respectively entered.

Herewith, in the embodiment, the bases 3 constituting the supporting units 101 are attached to the main body 200, and the joints 4 are attached to the movable member 300. As a result, the movable member 300 can be easily attached to the main body 200 in such a way that the movable member 300 is rotated with a movement wherein the rotation and transfer are combined by the rolling members 31 which are traveled and transferred along the guide faces 32a while the rolling members 31 are rotating.

Also, the movable member 300 can be attached to the main body 200 in such a way that the movable member 300 is forcibly traveled back and forth by the effect of the urging forces of the urging means 1 relative to the rolling members 31 situated in the beginning ends 32b of the guide faces 32a.

In the case that the automobile storage apparatus 500 is constituted with the operating mechanisms 100 wherein the movable member 300 of the above-explained operating mechanisms 100 is the lid member 301 closing the opening of the storage member 201 as the main body 200 installed inside a vehicle interior of an automobile in the first position CL, at the end of the back traveling of the lid member 301, i.e., at the final stage of the opening, force of the back traveling of the lid member 301 can be effectively reduced by a simple structure. Herewith, a high quality of the movement of the lid member 301 can be provided, and an impact noise at the end of the back traveling can be prevented.

In the example shown in the figures, the supporting units 101 are respectively attached to a pair of side plates 202 of the main body 200, and the lid member 301 is stably supported on both sides of the main body 200 respectively via the supporting units 101. In such a case, the springs 10 and the damper apparatuses 5 can be omitted in one of the pair of supporting units 101.

In the case that the lid member 301 is supported relative to the main body 200 in roughly the middle of the longitudinal direction of the lid member 301, the lid member 301 can be rotatably attached to the main body 200 by one of the supporting units 101 as mentioned above.

The disclosure of Japanese Patent Application No. 2005-153616 filed on May 26, 2005 is incorporated as a reference.

While the invention has been explained with reference to the specific embodiment of the invention, the explanation is illustrative, and the invention is limited only by the appended claims.

What is claimed is:

1. Operation mechanism for attaching a movable member to a main body rotatably between a first position and a second position, and holding the movable member in the first position by locking means, comprising:
    a base attached to the main body,
    a contact portion attached to the movable member,
    a coil spring having a winding portion with one end and the other end, said one end being fixed to the base and the other end being attached to the contact portion, said the other end being rotatable relative to the winding portion and rotating the movable member in the first position toward the second position, and
    a transfer track formed at the base and engaging the contact portion, said transfer track and said the other end of the coil spring being arranged to move the contact portion such that the movable member in the first position is moved to a predetermined position by said the other end by a force accumulated on the spring, and after the movable member passes the predetermined position in a direction to the second position, the winding portion of the coil spring again stores a force from the predetermined position to the second position by said the other end to reduce a movement speed from the first position to the predetermined position.

2. Operation mechanism according to claim 1, wherein said transfer track comprises a guide member having a guide face extending along an arc of an imaginary circle, and an arc shape through-bore,
    said contact portion comprises a shaft passing through the through-bore, and a rolling member provided on the shaft to rotate and travel along the guide face, and
    said other end of the coil spring is arranged to support the rolling member such that a circumferential face of the rolling member is always pressed against the guide face of the guide member, and when the rolling member is situated at a beginning of the guide face, the shaft is always pressed to allow the rolling member to contact the guide face and the spring stores an urging force to move the rolling member toward a final end of the guide face.

3. Operation mechanism according to claim 2, wherein said base includes a side face of the through-bore facing the guide face of the guide member, said side face forming a bearing face of the shaft and being curved in accordance with curvature of the guide face, and a pitch between the bearing face and the guide face being substantially equal to radius of the rolling member.

4. Operation mechanism according to claim 2, further comprising a damper apparatus attached to the rolling member for braking rotation of the movable member.

5. Operation mechanism according to claim 3, wherein said through-bore includes a first end as the beginning for placing the shaft when the movable member is in the first position, a second end for placing the shaft when the movable member is in the second position, and a middle position between the first and second ends, said shaft in the second end and the shaft in the first end being located on a same side relative a location of the other end of the coil spring in the middle position.

6. Operation mechanism according to claim 5, wherein the other end of the coil spring pushes the shaft from the first end to the middle position, and when the shaft is pushed further to the second end, the coil spring stores a force to push the shaft back to the middle position.

7. An automobile storage apparatus comprising a storage member as the main body, a lid member as the movable member for closing the opening of the storage member in the first position, and the operating mechanisms according to claim 1 for connecting the lid member to the storage member.

8. A storage apparatus comprising:
    a main body having an opening,
    a lid member for closing the opening of the main body,
    an operation mechanism for attaching the movable member to the main body rotatably between a first position and a second position, and
    a locking device for holding the movable member in the first position relative to the main body,
    wherein said operation mechanism comprises:
    a base formed at the main body and having an arc shape through-bore,
    a contact portion attached to the movable member, and including a shaft and a rolling member provided around the shaft, said shaft passing through the arc shape through-bore so as to move therealong, a torsion spring for applying a rotational force to the contact portion so as to move the contact portion along the arc shape through-bore, said torsion spring having a winding portion with one end and the other end, said one end being attached to the base and the other end being attached to the shaft, said the other end being rotatable relative to the winding portion and rotating the movable member in the first position toward the second position, and a transfer track for the contact portion formed at the base, said transfer track having an arc shape guide portion with a center of curvature same as that of the arc shape through-bore so that the shaft and the rolling member rotatingly travel along the arc shape through-bore and arc shape guide portion, respectively, by the rotational force of the torsion spring, wherein said arc shape through-bore includes a first end for placing the shaft when the movable member is in the first position, a second end for placing the shaft when the movable member is in the second position, and a middle position located between the first and second ends, said middle position being located in a horizontal direction furthest away from the center of the curvature, and said arc shape through-bore is arranged such that the shaft is moved from the first end to the middle position by said the other end by a force accumulated in the torsion spring and a force is again stored to the torsion spring when the shaft is moved from the middle position to the second end by said the other end to reduce a movement speed from the first position to the middle position.

9. A storage apparatus according to claim 8, wherein the middle position is located close to the second end to reduce a rotational speed of the shaft when the shaft is moved close to the second end.

10. A storage apparatus according to claim 9, further comprising a damper apparatus attached to the rolling member for braking rotation of the movable member and disposed in the center of the curvature.

11. Operation mechanism according to claim 1, wherein the other end of the coil spring rotates in one direction as the movable member rotates from the first position to the predetermined position, and rotates in a direction opposite to the one direction as the movable member further rotates from the predetermined position to the second position.

12. A storage apparatus according to claim 8, wherein the other end of the coil spring rotates in one direction as the shaft moves from the first end to the middle position, and moves in a direction opposite to the one direction as the shaft further rotates from the middle position to the second end.

* * * * *